(12) United States Patent
Ejury

(10) Patent No.: US 9,496,791 B2
(45) Date of Patent: Nov. 15, 2016

(54) MULTIPHASE BUCK CONVERTER WITH DYNAMIC PHASE FIRING

(71) Applicant: Infineon Technologies Austria AG, Villach (AT)

(72) Inventor: Jens Ejury, Fremont, CA (US)

(73) Assignee: Infineon Technologies Austria AG, Villach (AT)

( * ) Notice: Subject to any disclaimer, the term of this patent is extended or adjusted under 35 U.S.C. 154(b) by 39 days.

(21) Appl. No.: 14/032,097

(22) Filed: Sep. 19, 2013

(65) Prior Publication Data

US 2015/0077079 A1    Mar. 19, 2015

(51) Int. Cl.
H02M 3/158    (2006.01)

(52) U.S. Cl.
CPC ... H02M 3/1584 (2013.01); *H02M 2003/1586* (2013.01); *Y02B 70/1425* (2013.01)

(58) Field of Classification Search
CPC .................. H02M 3/1584; H02M 2003/1586
USPC ......................................... 323/272, 237, 246
See application file for complete search history.

(56) References Cited

U.S. PATENT DOCUMENTS

| | | | |
|---|---|---|---|
| 6,731,525 B2 | 5/2004 | Meiners | |
| 7,414,383 B2 | 8/2008 | Burton et al. | |
| 7,592,787 B2 * | 9/2009 | Qui et al. | 323/272 |
| 7,733,675 B2 | 6/2010 | Wu et al. | |
| 7,960,951 B2 * | 6/2011 | Southwell et al. | 323/272 |
| 8,085,015 B2 | 12/2011 | Lee | |
| 8,344,712 B2 | 1/2013 | Martin et al. | |
| 2008/0197824 A1 | 8/2008 | Qiu et al. | |
| 2011/0254531 A1 | 10/2011 | Markowski | |
| 2012/0249101 A1 | 10/2012 | Akey | |

FOREIGN PATENT DOCUMENTS

| | | |
|---|---|---|
| CN | 101521083 A | 9/2009 |
| CN | 102497098 A | 6/2012 |
| CN | 103269158 A | 8/2013 |
| DE | 102009043918 A1 | 4/2010 |

OTHER PUBLICATIONS

Office Action and Search Report, in the Chinese language, from counterpart Chinese Application No. 201410478646.0, dated Jun. 30, 2016, 11 pp.

* cited by examiner

*Primary Examiner* — Fred E Finch, III
*Assistant Examiner* — Rafael O. De León Domenech
(74) *Attorney, Agent, or Firm* — Shumaker & Sieffert, P.A.

(57) ABSTRACT

Methods, devices, and circuits are disclosed for a multiphase buck converter with dynamic phase firing that moderates phase output current. In one example, a method includes evaluating a current of a first phase output of the multiphase buck converter. The method further includes, in response to the current of the first phase output not being higher than a current threshold, applying one or more pulses from a first duty cycle signal to the first phase output. The method further includes, in response to the current of the first phase output being higher than the current threshold, applying one or more pulses from the first duty cycle signal to a second phase output.

18 Claims, 10 Drawing Sheets

MULTIPHASE BUCK CONVERTER WITH DYNAMIC PHASE FIRING

TECHNICAL FIELD

This disclosure relates to electrical power converters, and in particular, to multiphase buck converters.

BACKGROUND

Buck converters may be used as drivers for loads with specific current and/or voltage requirements. A multiphase buck converter efficiently applies an output voltage that is less than its input voltage. A multiphase buck converter also distributes its output current among multiple phase outputs, thereby reducing current and potentially temperature in individual phase output pathways. A multiphase buck converter typically alternates between phase outputs at a switching frequency in a fixed phase firing order.

When the load frequency of a load connected to the outputs of a multiphase buck converter is close to the switching frequency of the multiphase buck converter, the phase outputs of the multiphase buck converter may induce a resonant oscillation of current with a beat frequency in the load. A multiphase buck converter may be implemented with a varying switching frequency to try to avoid inducing such a resonant oscillation of current in the load.

SUMMARY

In general, various examples of this disclosure are directed to a multiphase buck converter with dynamic phase firing. In various examples of this disclosure, a multiphase buck converter with dynamic phase firing may moderate the current of the individual phase outputs of the multiphase buck converter. A multiphase buck converter with dynamic phase firing of this disclosure may prevent any individual phase output of the buck converter from reaching an extreme current. In various examples of this disclosure, a multiphase buck converter may include an anti-beat unit between a pulse width modulation (PWM) signal generator and phase output nodes of the multiphase buck converter. The anti-beat unit may intervene in the phase firing order of the PWM generator to dynamically rearrange the order of the phase firings to moderate or constrain the current of each phase output. A multiphase buck converter with dynamic phase firing may protect downstream components powered by the output of the converter from extremes of current and temperature.

One example is directed to a method of moderating phase output current of a multiphase buck converter. The method includes evaluating a current of a first phase output of the multiphase buck converter. The method further includes, in response to the current of the first phase output not being higher than a current threshold, applying one or more pulses from a first duty cycle signal to the first phase output. The method further includes, in response to the current of the first phase output being higher than the current threshold, applying one or more pulses from the first duty cycle signal to a second phase output.

Another example is directed to a circuit. The circuit includes a first input pin for coupling to a first duty cycle signal of a pulse width modulator (PWM) generator of a multiphase buck converter. The integrated circuit further includes a first output pin for coupling to a first phase output node of the multiphase buck converter. The integrated circuit further includes a second output pin for coupling to a second phase output node of the multiphase buck converter. The integrated circuit further includes an anti-beat unit. The anti-beat unit is configured to evaluate a current of a first phase output of the multiphase buck converter. The anti-beat unit is further configured to, in response to the current of the first phase output not being higher than a current threshold, apply one or more pulses from a first duty cycle signal to the first phase output node. The anti-beat unit is further configured to, in response to the current of the first phase output being higher than the current threshold, apply one or more pulses from the first duty cycle signal to the second phase output node.

Another example is directed to a device for moderating phase output current of a multiphase buck converter. The device includes means for evaluating a current of a first phase output of the multiphase buck converter. The device further includes means for applying, in response to the current of the first phase output not being higher than a current threshold, one or more pulses from a first duty cycle signal to the first phase output node. The device further includes means for applying, in response to the current of the first phase output being higher than the current threshold, one or more pulses from the first duty cycle signal to second phase output node.

The details of one or more examples of the invention are set forth in the accompanying drawings and the description below. Other features, objects, and advantages of the invention will be apparent from the description and drawings, and from the claims.

DETAILED DESCRIPTION

As noted above, in various examples of this disclosure, a multiphase buck converter with dynamic phase firing may moderate the current of the individual phase outputs of the multiphase buck converter. A multiphase buck converter of this disclosure may apply such dynamic phase firing of its phase outputs based on an ongoing evaluation of the current of the phase outputs, thereby directly and reliably preventing the current of any one phase output from becoming extreme. A resonant oscillation of current with a beat frequency in the load may cause the average current of a single phase output to continuously rise, and may repeatedly stress certain components at increasingly higher currents. Extreme currents in individual phase outputs may rise above current limits on downstream components such as power MOSFETs and destroy the components. Extreme currents in individual phase outputs may also lead to extreme temperatures in downstream elements such as inductors, which may also be destructive.

A multiphase buck converter with dynamic phase firing of this disclosure may reduce or eliminate the dangers of extreme currents or temperatures caused by resonant oscillation of phase output current in a load. A multiphase buck converter with dynamic phase firing of this disclosure may quickly and reliably re-balance the current among the phase outputs, thereby moderating the current in each phase output as delivered to the load. A multiphase buck converter with dynamic phase firing of this disclosure may ensure reliable prevention of inducing a resonant harmonic or sub-harmonic oscillation of current with a beat frequency in the load. A multiphase buck converter with dynamic phase firing of this disclosure may provide a more reliable solution than addressing the problem by simply varying the switching frequency, which may still induce a resonant oscillation of current in a load.

Figure 1:
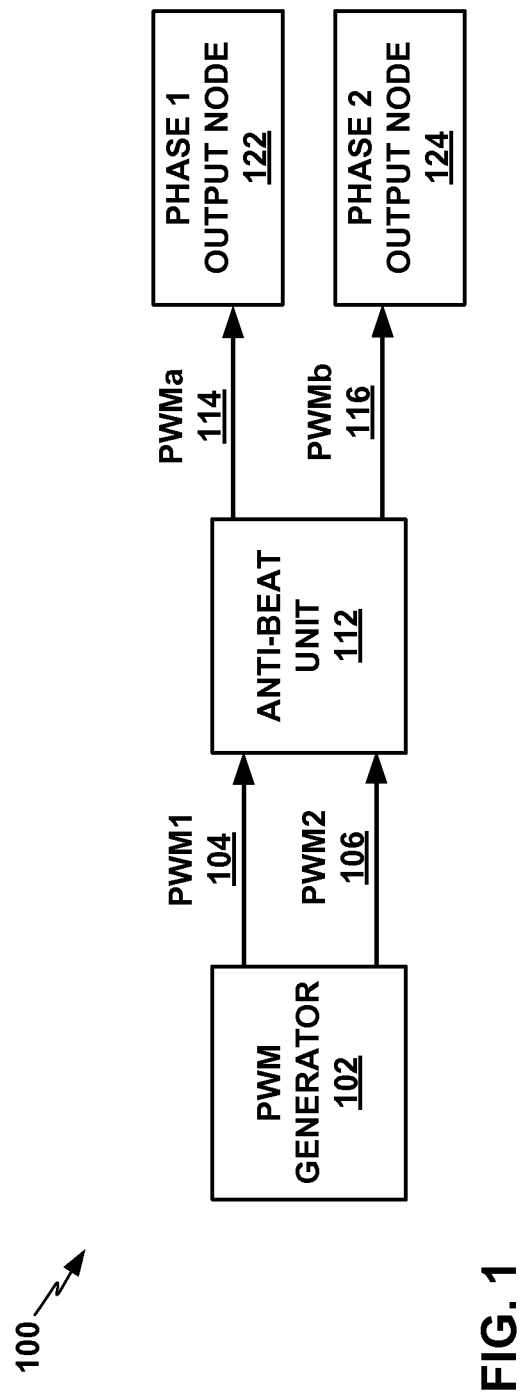
FIG. 1 is a block diagram illustrating a multiphase buck converter with an anti-beat unit that enables dynamic phase firing in the multiphase buck converter, in accordance with an example of this disclosure.

FIG. 1 is a block diagram illustrating a multiphase buck converter 100 with an anti-beat unit 112 that enables dynamic phase firing in multiphase buck converter 100, in accordance with an example of this disclosure. Multiphase buck converter 100 includes anti-beat unit 112 positioned between a pulse width modulation (PWM) generator 102 and first and second phase output nodes 122, 124 of multiphase buck converter 100. Anti-beat unit 112 may intervene in the phase firing order of PWM generator 102 to dynamically rearrange the order of the phase firings of PWM generator 102 to moderate or constrain the current of each phase output. Anti-beat unit 112 may thereby inhibit or prevent the propagation of beat patterns or harmonic oscillations that might lead to extremes in the current of any phase output from multiphase buck converter 100 to a load driven by multiphase buck converter 100.

The initial outputs of PWM generator 102, before being evaluated and acted upon by anti-beat unit 112, may be referred to as duty cycle signals. PWM generator 102 generates a first duty cycle signal PWM1 104 and a second duty cycle signal PWM2 106, which are received by anti-beat unit 112. Anti-beat unit 112 may be coupled to PWM generator 102, such as by two input pins, for example, that may conduct first duty cycle signal PWM1 104 and second duty cycle signal PWM2 106 from PWM generator 102 to anti-beat unit 112 as shown in FIG. 1.

Anti-beat unit 112 may initially apply the first duty cycle signal PWM1 104 to first phase output PWMa 114 and apply the second duty cycle signal PWM2 106 to second phase output PWMb 116. Anti-beat unit 112 may also evaluate the current of first phase output PWMa 114 and/or evaluate the current of second phase output PWMb 116. Anti-beat unit 112 may then perform a selected action with respect to first duty cycle signal PWM1 104 and second duty cycle signal PWM2 106 in response to the current of first phase output PWMa 114 and/or the current of second phase output PWMb 116.

Anti-beat unit 112 may evaluate the value of the phase currents of all phases (e.g., PWMa 114 and PWMb 116) before the next start of a high-side metal-oxide-semiconductor field effect transistor (HS-MOSFET) duty cycle from PWM generator 102. Based on the value of the phase currents, anti-beat unit 112 may apply the duty cycle signal to a phase output other than one with a highest current value. In other words, if anti-beat unit 112 would have applied a subsequent duty cycle signal to a particular phase output, but that particular phase output has a current that is higher than a threshold of current (e.g., compared to the current of each of the one or more other phase outputs), anti-beat unit 112 may refrain from selecting the particular phase output to fire. Instead, anti-beat unit 112 may apply the duty cycle signal to a different phase that has a lower current than the particular phase output with the current that is higher than a threshold, potentially as compared to the other phases. In examples with two phase outputs, such as the example shown in FIG. 1, anti-beat unit 112 may apply the duty cycle signal to the other phase output (e.g., PWMa 114 or PWMb 116) that has a lower current than the particular phase output with the current that is higher than a threshold.

Anti-beat unit 112 may regularly or continuously evaluate the current of the phase outputs with respect to a threshold current. In some examples, the threshold current may be based on the current of the other phases (e.g., with respect to the current of each of the one or more other phase outputs). Anti-beat unit 112 may select a given duty cycle signal to apply to a selected phase output according to any of several different possible schemes. In one set of examples, anti-beat unit 112 may always fire the phase with the lowest current; that is, anti-beat unit 112 may always apply each duty cycle signal to the phase output that anti-beat unit 112 evaluates to have the lowest current. In another set of examples, anti-beat unit 112 may apply the duty cycle signals to the phase outputs in a fixed sequence until or unless anti-beat unit 112 evaluates that a particular phase output exceeds a threshold, and then anti-beat unit 112 may depart from the fixed sequence of phase firings and fire a different phase with a lower current or with the lowest current. Subsequently, in these examples, once anti-beat unit 112 evaluates that the current is below the threshold on all the phases, anti-beat unit 112 may return to applying the duty cycle signals to the phase outputs in the fixed sequence.

Once each duty cycle has expired (e.g., once anti-beat unit 112 has applied each duty cycle signal to one of the phase outputs), anti-beat unit 112 may perform a new evaluation of the phase outputs for the next duty cycle. At this point, anti-beat unit 112 may start the procedure again.

For example, if the current of the first phase output PWMa 114 is not higher than a current threshold $I_{th}$, anti-beat unit 112 may, in response, apply one or more pulses from first duty cycle signal PWM1 104 to first phase output PWMa 114. In this example, if, on the other hand, the current of the first phase output PWMa 114 is higher than the current threshold $I_{th}$, anti-beat unit 112 may, in response, apply one or more pulses from first duty cycle signal PWM1 104 to second phase output PWMb 116.

Anti-beat unit 112 may apply the first phase output PWMa 114 to a first phase output node 122 of the multiphase buck converter 100, and apply the second phase output PWMb 116 to a second phase output node 124 of the multiphase buck converter 100. Anti-beat unit 112 may be coupled to first phase output node 122 and second phase output node 124, such as by two output pins, for example, that may conduct first phase output PWMa 114 and second phase output phase output PWMb 116 from anti-beat unit 112 to first phase output node 122 and second phase output node 124 as shown in FIG. 1.

First and second phase outputs PWMa 114 and PWMb 116, therefore, may or may not be different from first and second duty cycle signals PWM1 104 and PWM2 106 at a given time. First and second phase outputs PWMa 114 and PWMb 116 are the result of anti-beat unit 112 evaluating first and second duty cycle signals PWM1 104 and PWM2 106 and determining, in response, whether or how to apply pulses from first and second duty cycle signals PWM1 104 and PWM2 106 to first and second phase outputs PWMa 114 and PWMb 116. First and second finalized phase outputs PWMa 114 and PWMb 116 may incorporate any potential modification of the phase outputs and moderation of the phase output currents as applied by anti-beat unit 112, to be applied as the phase outputs of multiphase buck converter 100.

For example, anti-beat unit 112 may detect when a beat frequency is occurring in first and second duty cycle signals PWM1 104 and PWM2 106, or when an excessive current is arising in one of first and second duty cycle signals PWM1 104 and PWM2 106 and/or an increasingly negative current is arising in one of first and second duty cycle signals PWM1 104 and PWM2 106. Anti-beat unit 112 may also detect other triggering conditions, in various examples. Anti-beat unit 112 may rearrange the phase firing order from first and second duty cycle signals PWM1 104 and PWM2 106 as applied to first and second phase outputs PWMa 114 and PWMb 116 to inhibit or eliminate such a beat frequency, and/or to reduce or moderate the current of an individual one of first and second phase outputs PWMa 114 and PWMb 116 relative to first and second duty cycle signals PWM1 104 and PWM2 106.

When anti-beat unit 112 detects that first and second duty cycle signals PWM1 104 and PWM2 106 do not pose significant issues of beat frequency or excessive current, anti-beat unit 112 may simply allow first and second duty cycle signals PWM1 104 and PWM2 106 to propagate through to first and second phase outputs PWMa 114 and PWMb 116, or otherwise apply first and second duty cycle signals PWM1 104 and PWM2 106 to first and second phase outputs PWMa 114 and PWMb 116. Also, after anti-beat unit 112 has intervened to rearrange the phase firing order of first and second phase outputs PWMa 114 and PWMb 116 relative to first and second duty cycle signals PWM1 104 and PWM2 106, anti-beat unit 112 may detect a condition indicating that the intervention has successfully run its course. Anti-beat unit 112 may then return to allowing first and second duty cycle signals PWM1 104 and PWM2 106 to propagate through to first and second phase outputs PWMa 114 and PWMb 116, or otherwise apply first duty cycle signal PWM1 104 to first phase output PWMa 114 and apply second duty cycle signal PWM2 106 to second phase output PWMb 116.

The condition indicating that the intervention has successfully run its course, which may be referred to as a "resume regular" condition (for resuming regular phase firing sequence), may be that the phase output with the nascent extreme current has dropped to a current below a set low current threshold, for example. The resume regular condition may also be a condition where the difference in current between the two phase outputs has dropped to within a set margin, for example.

Anti-beat unit 112 may continue evaluating first and second phase outputs PWMa 114 and PWMb 116, either at every incoming pulse of first and second duty cycle signals PWM1 104 and PWM2 106 or at some other interval. Anti-beat unit 112 may then intervene to rearrange the phase firing order once again if it detects a recurrence of a trigger condition, such as a nascent beat frequency or extreme current in first and second phase outputs PWMa 114 and PWMb 116. Anti-beat unit 112 may also evaluate additional trigger conditions or criteria, such as the state of one or more prior reordered phase firings, or the temperature at or proximate to inductors or other components downstream of first phase output node 122 and/or second phase output node 124 of multiphase buck converter 100, for example.

Anti-beat unit 112 may evaluate potential trigger conditions, such as the current of each of first and second phase outputs PWMa 114 and PWMb 116, after each pulse of either of first and second duty cycle signals PWM1 104 and PWM2 106, or at some other interval. Anti-beat unit 112 may incorporate its evaluation of trigger conditions prior to applying each individual pulse to first and second phase outputs PWMa 114 and PWMb 116, or at some other interval, in various examples. In various examples, the phase outputs PWMa 114 and PWMb 116 of multiphase buck converter 100 are therefore not necessarily fixed or predetermined, or set to randomly or blindly varying frequencies, but are moderated at each pulse, or at some other interval, based on ongoing evaluations of conditions relevant to potential current extremes.

Additional information anti-beat unit 112 may evaluate as trigger conditions and/or as resume regular conditions may include the charge accumulated at one or more capacitors, and/or the temperature at or proximate to one or more inductors, downstream of first and second phase output nodes 122, 124 of multiphase buck converter 100, for example. In some examples, anti-beat unit 112 may balance a goal of charging the one or more capacitors sufficiently with the goal of moderating the current of the phase outputs PWMa 114 and PWMb 116, as part of evaluating trigger conditions and/or resume regular conditions. In some examples, anti-beat unit 112 may evaluate a goal of preventing excessive temperature at or near the one or more inductors or other components along with the goal of moderating the current of the phase outputs PWMa 114 and PWMb 116, as part of evaluating trigger conditions and/or resume regular conditions.

Figure 2:
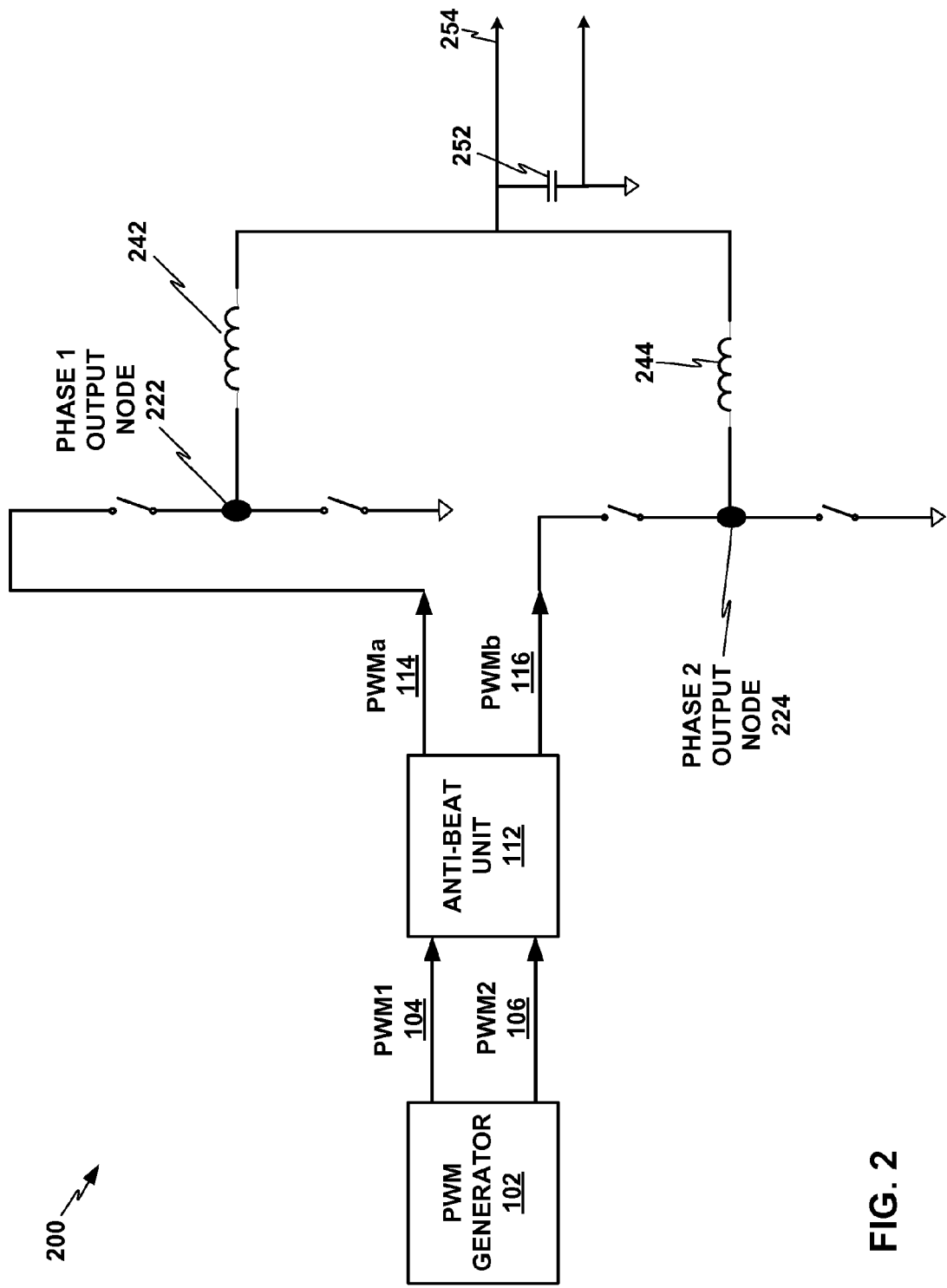
FIG. 2 depicts a block diagram of a multiphase buck converter that incorporates additional detail, including inductors and a capacitor downstream of first and second phase output nodes, in accordance with an example of this disclosure.

FIG. 2 depicts a block diagram of a multiphase buck converter 200 that incorporates additional detail, including inductors and a capacitor downstream of first and second phase output nodes 122, 124, in accordance with an example of this disclosure. As in the example of FIG. 1, multiphase buck converter 200 includes PWM generator 102, anti-beat unit 112, first and second duty cycle signals PWM1 104 and PWM2 106 applied by PWM generator 102 and received by anti-beat unit 112, and first and second phase outputs PWMa 114 and PWMb 116 applied by anti-beat unit 112. First phase output PWMa 114 is applied via first phase output node 222 to a first inductor 242, and second phase output PWMb 116 is applied via second phase output node 224 to a second inductor 244. First and second inductors 242, 244 are further coupled to an output capacitor 252 and a load output pin 254.

Multiphase buck converter 200 therefore shows additional detail of how a multiphase buck converter of this disclosure may apply a lower output voltage at load output pin 254 than its input voltage, in one example. Multiphase buck converter 200 may also provide information on the temperature at or proximate to inductors 242 and/or 244, and/or information on the accumulated charge at output capacitor 252, to anti-beat unit 112. Anti-beat unit 112 may then evaluate this information as part of a trigger condition and/or a resume regular condition in determining the phase firing order of first and second phase outputs PWMa 114 and PWMb 116. Anti-beat unit 112 may apply the phase firing order at least in part to inhibit or prevent excessive temperature at inductors 242 and/or 244, or at least in part to maintain or support sufficient charge at output capacitor 252, in some examples.

Figure 3:
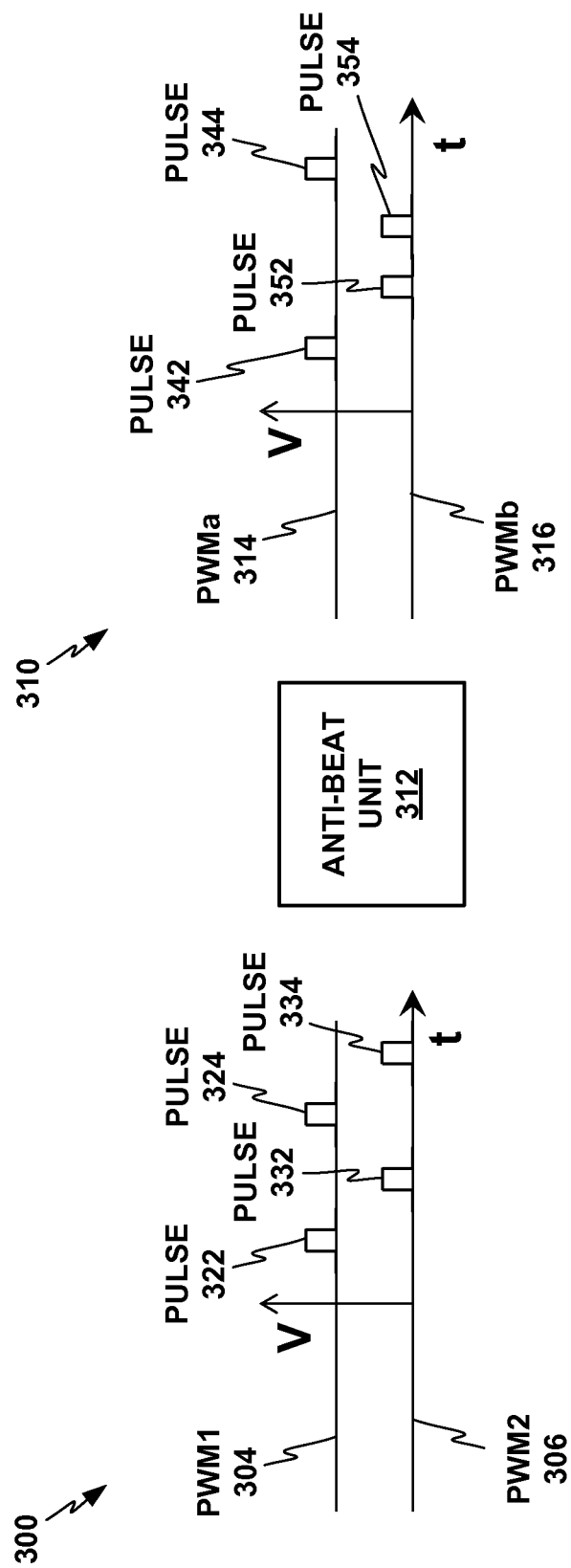
FIG. 3 is a set of related graphs of voltage over time for first and second duty cycle signals supplied to an anti-beat unit, and first and second phase outputs applied by the anti-beat unit, in accordance with an example of this disclosure.

FIG. 3 is a set of related graphs 300, 310 of voltage over time for first and second duty cycle signals PWM1 304 and PWM2 306 supplied to an anti-beat unit 312, and first and second phase outputs PWMa 314 and PWMb 316 applied by anti-beat unit 312, in accordance with an example of this disclosure. Graphs 300 and 310 each show time along the x axis and voltage along the y axis, with the voltage for each of two different lines set at two different vertically translated zero points on the respective graphs.

As shown in graph 300, first and second duty cycle signals PWM1 304 and PWM2 306, as might be supplied by a PWM generator (not shown in FIG. 3), may be characterized by a fixed sequence of alternating pulses 322, 332, 324, 334. As shown in graph 310, first and second phase outputs PWMa 314 and PWMb 316 applied by anti-beat unit 312, based on duty cycle signals PWM1 304 and PWM2 306, may be characterized by a rearranged phase firing order. In the rearranged phase firing order, as shown in graph 310, anti-beat unit 312 has admitted or applied pulses 342 and 352 in first and second phase outputs PWMa 314 and PWMb 316, respectively, as in the regular phase firing order in duty cycle signals PWM1 304 and PWM2 306. In the rearranged phase firing order, as further shown in graph 310, anti-beat unit 312 has rearranged the phase firing order by applying pulse 354 to second phase output PWMb 316 at a time corresponding to pulse 324, and applying pulse 344 to first phase output PWMa 314 at a time corresponding to pulse 334. While FIG. 3 shows one example of a rearranged firing order applied by anti-beat unit 312, anti-beat unit 312 may apply any other rearranged firing order of pulses in phase outputs PWMa 314 and PWMb 316.

Figure 4:
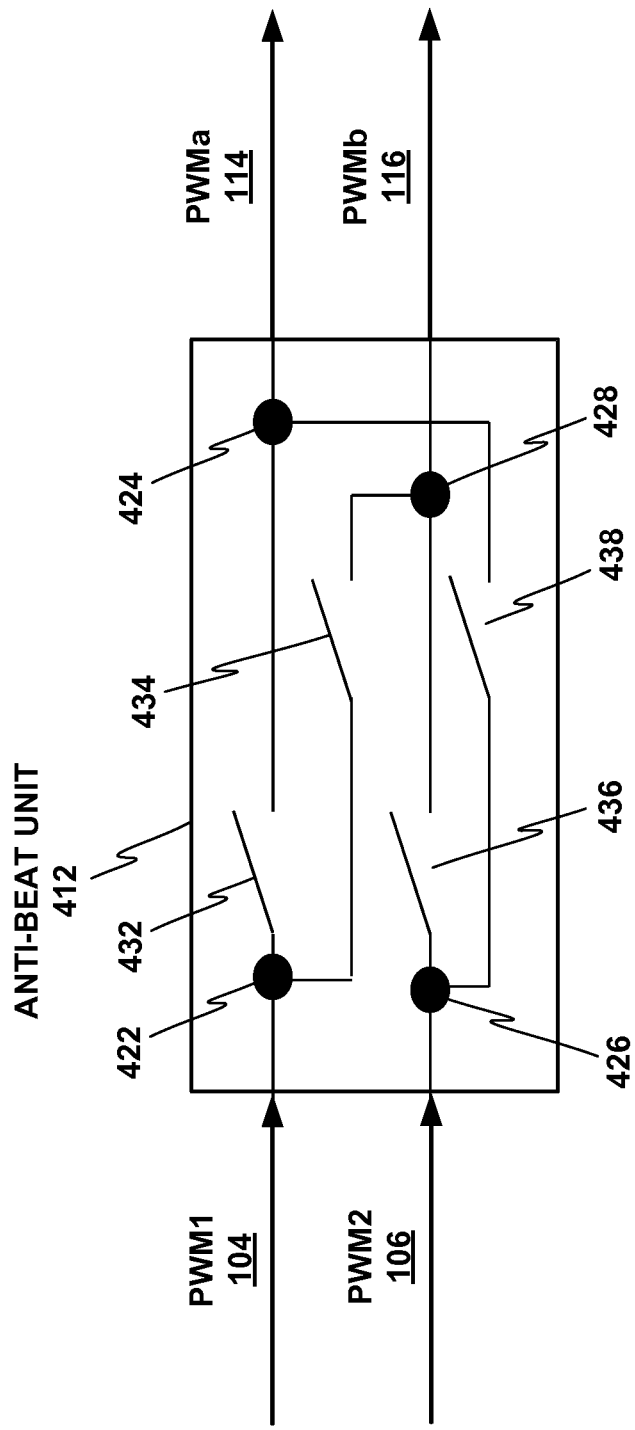
FIG. 4 depicts an anti-beat unit receiving duty cycle signals and applying phase outputs, in accordance with an example of this disclosure.

FIG. 4 depicts an anti-beat unit 412 receiving duty cycle signals PWM1 104 and PWM2 106 and applying phase outputs PWMa 114 and PWMb 116, in accordance with an example of this disclosure. FIG. 4 shows additional detail of anti-beat unit 412 in one example, including nodes 422, 424, 426, 428, and switches 432, 434, 436, and 438. Anti-beat unit 412 may apply the normal phase firing order from preliminary phase outputs PWM1 104 and PWM2 106 to phase outputs PWMa 114 and PWMb 116 by keeping switches 432 and 436 closed and switches 434 and 438 open. With the switches configured in this way, anti-beat unit 412 admits or applies pulses from duty cycle signals PWM1 104 and PWM2 106 in the regular phase firing order through to phase outputs PWMa 114 and PWMb 116.

Anti-beat unit 412 may divert one or more pulses from first duty cycle signal PWM1 104 to second phase output PWMb 116, and/or one or more pulses from second duty cycle signal PWM2 106 to first phase output PWMa 114, by turning switches 432 and 436 open and switches 434 and 438 closed. Anti-beat unit 412 may turn switches 432, 434, 436, 438 after each individual pulse, or at some other interval, in either of duty cycle signals PWM1 104 or PWM2 106. Anti-beat unit 412 may therefore rearrange the phase firing order dynamically in any arrangement as applied to phase outputs PWMa 114 and PWMb 116, in this example. Anti-beat units in other examples of this disclosure may use a variety of other means, including integrated circuits, processing units executing software, or other devices, to rearrange the phase firing order from duty cycle signals PWM1 104 and PWM2 106 as applied to phase outputs PWMa 114 and PWMb 116.

Figure 5:
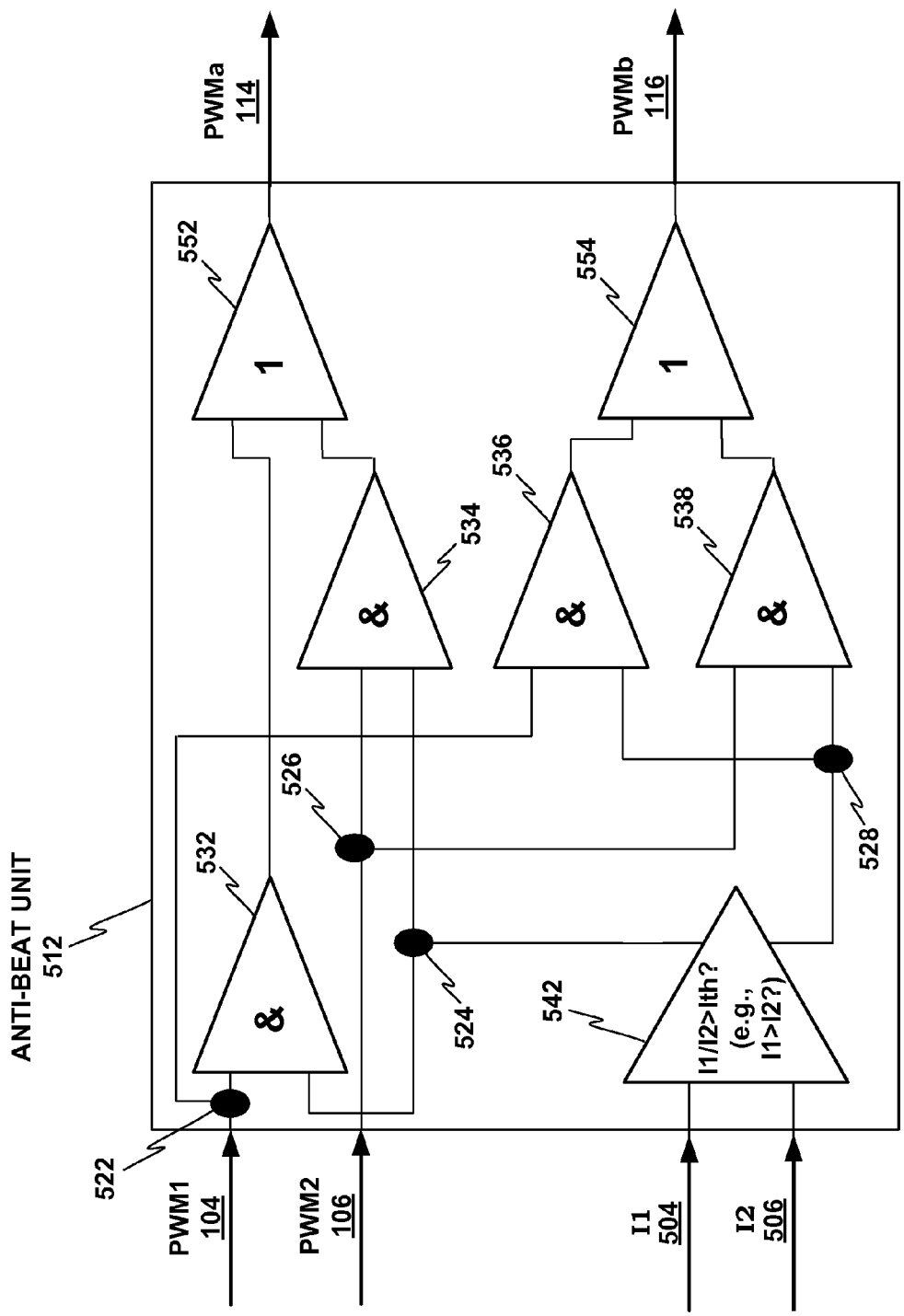
FIG. 5 depicts a circuit diagram of an anti-beat unit implemented as an integrated circuit receiving duty cycle signals and first and second phase output current signals, and applying phase outputs, in accordance with an example of this disclosure.

FIG. 5 depicts a circuit diagram of an anti-beat unit 512 implemented as an integrated circuit receiving duty cycle signals PWM1 104 and PWM2 106 and first and second phase output current signals I1 504 and I2 506, and applying phase outputs PWMa 114 and PWMb 116, in accordance with an example of this disclosure. First phase output current signal I1 504 indicates the current in first phase output PWMa 114, and second phase output current signal I2 506 indicates the current in second phase output PWMb 116. The circuit diagram of anti-beat unit 512 as shown in FIG. 5 includes logic gates depicted in standard International Electrotechnical Commission (IEC) symbols, including AND gates 532, 534, 536, and 538; comparator 542; OR gates 552 and 554; and nodes 522, 524, 526, 528. Anti-beat unit 512 illustrates one particular example of how an anti-beat unit of this disclosure may be implemented.

As shown in FIG. 5, anti-beat unit 512 applies first duty cycle signal PWM1 104 via node 522 to inputs of AND gates 532 and 536, and applies second duty cycle signal PWM2 106 via node 526 to inputs of AND gates 534 and 538. Anti-beat unit 512 applies first phase output current signal I1 504 and second phase output current signal I2 506 to comparator 542. Comparator 542 may evaluate the first phase output current signal I1 504 and/or the second phase output current signal I2 506, including by comparing either or both of first phase output current signal I1 504 and second phase output current signal I2 506 to a current threshold. Comparator 542 may set the current threshold $I_{th}$ to be based on one of first phase output current signal I1 504 and second phase output current signal I2 506, in some examples. Comparator 542 may set the current threshold $I_{th}$ to be equal to the second phase output current signal I2 506, and compare whether the first phase output current signal I1 504 is greater than or less than the second phase output current signal I2 506, in some examples. Comparator 542 may also adjust or modify the current threshold $I_{th}$ or base the current threshold $I_{th}$ in part on additional trigger conditions, such as a signal indicating a state of one or more previously applied pulses, a temperature of one or more downstream components, or a charge accumulated at one or more downstream capacitors, for example.

In the example of FIG. 5, anti-beat unit 512 may be implemented such that comparator 542 may set the current threshold $I_{th}$ to be equal to the second phase output current signal I2 506, and may evaluate whether or not first phase output current signal I1 504 is higher than or greater than second phase output current signal I2 506. In this way, anti-beat unit 512 may apply each incoming pulse of first or second duty cycle signals PWM1 104, PWM2 106 to whichever of first or second phase outputs PWMa 114, PWMb 116 has a lower current at the time of the evaluation. As shown in the example of FIG. 5, the outputs of AND gates 532 and 534 are coupled to the inputs of OR gate 552. The output of OR gate 552 serves as first phase output PWMa 114. The outputs of AND gates 536 and 538 are coupled to the inputs of OR gate 554. The output of OR gate 554 serves as second phase output PWMb 116. The comparator 542 may apply a high signal to node 528 if it evaluates that first phase output current signal I1 504 is greater than second phase output current signal I2 506, and apply a high signal to node 524 if it evaluates that first phase output current signal I1 504 is not greater than second phase output current signal I2 506.

In this way, if anti-beat unit 512 receives a pulse on first duty cycle signal PWM1 104 while comparator 542 evaluates the trigger conditions (including evaluating first phase output current signal I1 504) and finds that first phase output current signal I1 504 is not greater than second phase output current signal I2 506 (which is set as the current threshold $I_{th}$), then comparator 542 applies a high signal to node 524, both inputs to AND gate 532 are high, AND gate 532 applies a high output as an input to OR gate 552 (while the outputs of the remaining AND gates 534, 536, and 538 are low), and OR gate 552 applies a high output as first phase output PWMa 114. If anti-beat unit 512 receives a pulse on first duty cycle signal PWM1 104 while comparator 542 finds that first phase output current signal I1 504 is higher than second phase output current signal I2 506, then comparator 542 applies a high signal to node 528, both inputs to AND gate 536 are high, AND gate 536 applies a high output as an input to OR gate 554 (while the outputs of the remaining AND gates 532, 534, and 538 are low), and OR gate 554 applies a high output as second phase output PWMb 116. Thus, in this example, anti-beat unit 512 applies an incoming pulse of first duty cycle signal PWM1 104 to whichever of first or second phase outputs PWMa 114, PWMb 116 has a lower current at that time (or, at the time comparator 542 makes its evaluation of the current of first and second phase outputs PWMa 114, PWMb 116).

In the implementation shown in FIG. 5, anti-beat unit 512 also applies an incoming pulse of second duty cycle signal PWM2 106 to whichever of first or second phase outputs PWMa 114, PWMb 116 has a lower current at that time. If anti-beat unit 512 receives a pulse on second duty cycle signal PWM2 106 while comparator 542 evaluates that first phase output current signal I1 504 is higher than second phase output current signal I2 506, then the pulse on second duty cycle signal PWM2 106 transmits a high signal via node 526 to one input of AND gate 538 while comparator 542 applies a high signal via node 528 to the other input of AND gate 538. AND gate 538 applies a high output to OR gate 554, which applies a high output to second phase output PWMb 116. Anti-beat unit 512 may thus apply this high output to second phase output PWMb 116 for a duration that matches the duration of the incoming pulse of second duty cycle signal PWM2 106, such that the high output anti-beat unit 512 applies to second phase output PWMb 116 takes the form of a similar pulse.

Correspondingly, if anti-beat unit 512 receives a pulse on second duty cycle signal PWM2 106 while comparator 542 evaluates that first phase output current signal I1 504 is not higher than second phase output current signal I2 506, then the pulse on second duty cycle signal PWM2 106 transmits a high signal via node 526 to one input of AND gate 534 while comparator 542 applies a high signal via node 524 to the other input of AND gate 534. AND gate 534 applies a high output to OR gate 552, which applies a high output to first phase output PWMa 114. Therefore, in this example, anti-beat unit 512 also applies an incoming pulse of second duty cycle signal PWM2 106 to whichever of first or second phase outputs PWMa 114, PWMb 116 has a lower current at that time.

In another example, anti-beat unit 512 may be implemented such that comparator 542 may set the current threshold $I_{th}$ to be equal to the second phase output current signal I2 506 plus a current margin Δ ("delta"). Comparator 542 may evaluate whether or not first phase output current signal I1 504 is not higher than second phase output current signal I2 506 plus the current margin Δ. If first phase output current signal I1 504 is not higher than second phase output current signal I2 506 plus the current margin Δ, comparator 542 may apply pulses from first duty cycle signal PWM1 104 to first phase output PWMa 114 and apply pulses from second duty cycle signal PWM2 106 to second phase output PWMb 116. If first phase output current signal I1 504 is higher than second phase output current signal I2 506 plus the current margin Δ, comparator 542 may apply pulses from first duty cycle signal PWM1 104 to second phase output PWMb 116 and apply pulses from second duty cycle signal PWM2 106 to first phase output PWMa 114. Other implementations of an anti-beat unit of this disclosure may be configured in other ways to achieve the same results or to incorporate additional conditions or criteria to adjust or modify trigger conditions or to evaluate first and/or second phase output current signals I1 504, I2 506.

Figure 6:
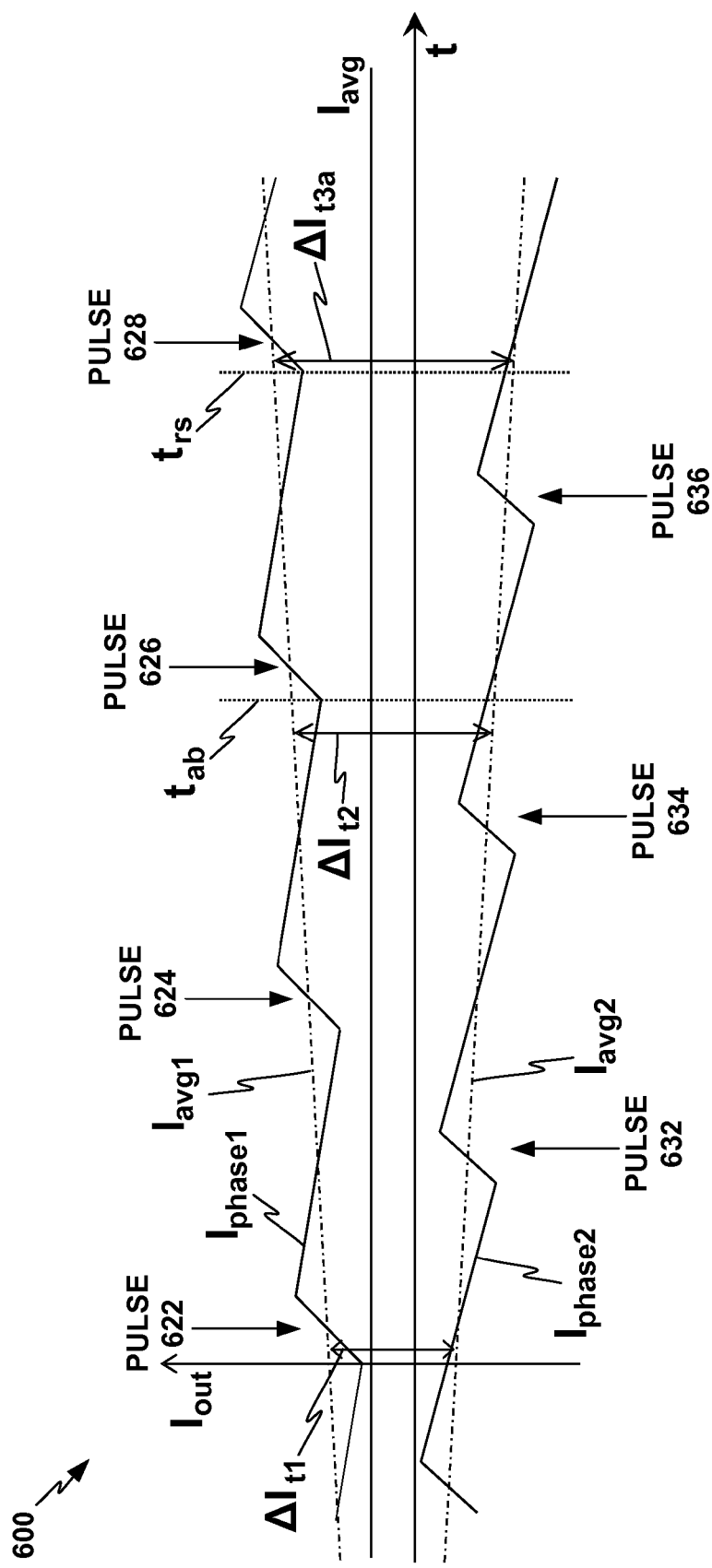
FIG. 6 shows a graph of phase output currents over time of a multiphase buck converter in the absence of operation of an anti-beat unit of this disclosure, showing a beat frequency of two phase output currents becoming increasingly extreme.

FIG. 6 shows a graph 600 of phase output currents over time of a multiphase buck converter in the absence of operation of an anti-beat unit of this disclosure, showing a beat frequency of two phase output currents becoming increasingly extreme. Graph 600 includes a first phase current $I_{phase1}$, a second phase current $I_{phase2}$, a first phase current trailing average $I_{avg1}$, a second phase current trailing average $I_{avg2}$, and a combined first and second phase current trailing average $I_{avg}$. First phase current $I_{phase1}$ continues rising increasingly higher through fixed firing order pulses 622, 624, 626, 628 (as examples of a potentially longer sequence), while second phase current $I_{phase2}$ continues dropping increasingly negative through fixed firing order pulses 632, 634, 636 (as examples of a potentially longer sequence), even as the combined first and second phase current trailing average $I_{avg}$ remains constant, as the total net current of the output of the multiphase buck converter. Average current margins $\Delta I_{t1}$, $\Delta I_{t2}$, $\Delta I_{t3a}$ as margins between the first and second phase current trailing averages $I_{avg1}$, and $I_{avg2}$, are shown as they continue increasing over time. Times $t_{ab}$ and $t_{rs}$ are shown for comparison with FIG. 7.

Figure 7:
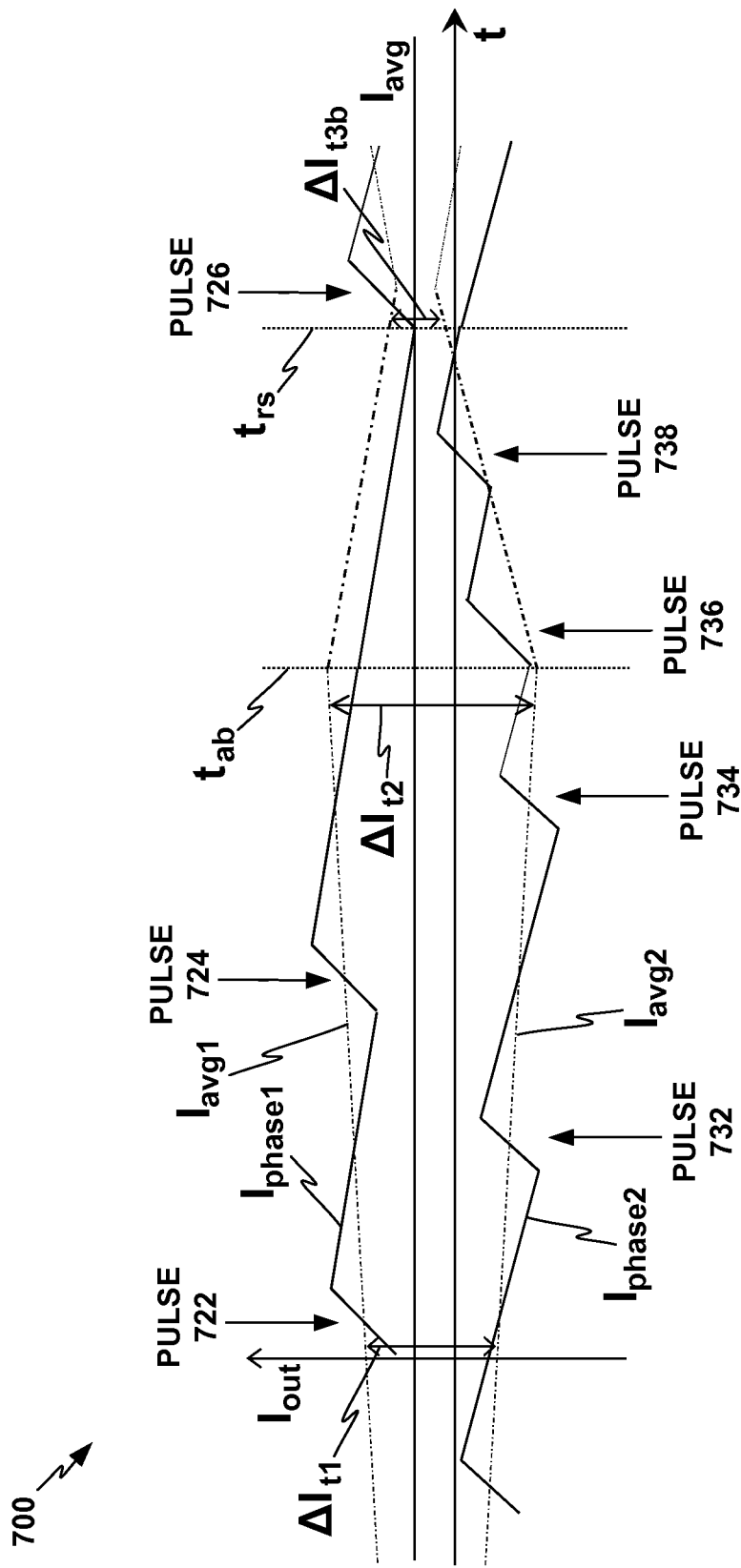
FIG. 7 shows a graph of phase output currents over time of a multiphase buck converter with the operation of an anti-beat unit of this disclosure, showing a beat frequency of two phase output currents being corrected and the margin between the currents being moderated by intervention of an anti-beat unit, in accordance with an example of this disclosure.

FIG. 7 shows a graph 700 of phase output currents over time of a multiphase buck converter with the operation of an anti-beat unit of this disclosure, showing a beat frequency of two phase output currents being corrected and the margin between the currents being moderated by intervention of an anti-beat unit, in accordance with an example of this disclosure. Graph 700 also includes a first phase current $I_{phase1}$, a second phase current $I_{phase2}$, a first phase current trailing average $I_{avg1}$, a second phase current trailing average $I_{avg2}$, and a combined first and second phase current trailing average $I_{avg}$. First phase current $I_{phase1}$ initially rises increasingly higher through fixed firing order pulses 722 and 724, while second phase current $I_{phase2}$ initially drops increasingly negative through fixed firing order pulses 732 and 734. The combined first and second phase current trailing average $I_{avg}$ also continues remaining constant as the total net current of the output of the multiphase buck converter. Average current margins $\Delta I_{t1}$ and $\Delta I_{t2}$ are shown as margins between the first and second phase current trailing averages $I_{avg1}$ and $I_{avg2}$ as they increase over time, until a time $t_{ab}$.

At time $t_{ab}$, an anti-beat unit of this disclosure evaluates that the current of the first phase output is higher than a selected current threshold. The anti-beat unit may be set with a current threshold equal to average current margin $\Delta I_{t2}$, such that when the anti-beat unit evaluates the phase output currents and detects that the phase output currents have crossed this threshold, the anti-beat unit rearranges the firing order of the phase outputs in response. The anti-beat unit applies one or more pulses from the first duty cycle signal to a second phase output, thereby modifying or rebalancing the currents of the phase outputs. The anti-beat unit thus intervenes to prevent continued duty cycle signal pulses from a PWM generator to the first phase current $I_{phase1}$, and instead applies a concentrated sequence of the duty cycle signal pulses 736, 738 (as examples of a potentially longer sequence) to the phase output with the lower current, the second phase current $I_{phase1}$. By so doing, the anti-beat unit moderates the phase output currents, bringing down the first phase current trailing average $I_{avg1}$ and raising the second phase current trailing average $I_{avg2}$.

As shown in the example of FIG. 7, the anti-beat unit continues intervening in the phase firing order until time $t_{rs}$, when the anti-beat unit may detect a resume regular phase firing order condition. This resume regular condition may be that the anti-beat unit detects that the average current margin $\Delta I_{t3b}$ has dropped below a low current threshold, for example. The low current threshold may be set equal to the first current threshold minus a hysteresis margin that accounts for a hysteresis in responses of the second phase output to the applying of the one or more pulses from the first duty cycle signal to the second phase output, in one example. The anti-beat unit may then return the phase firing order to its regular sequence, with its phase output currents usefully moderated to safe levels, in one example.

Figure 8:
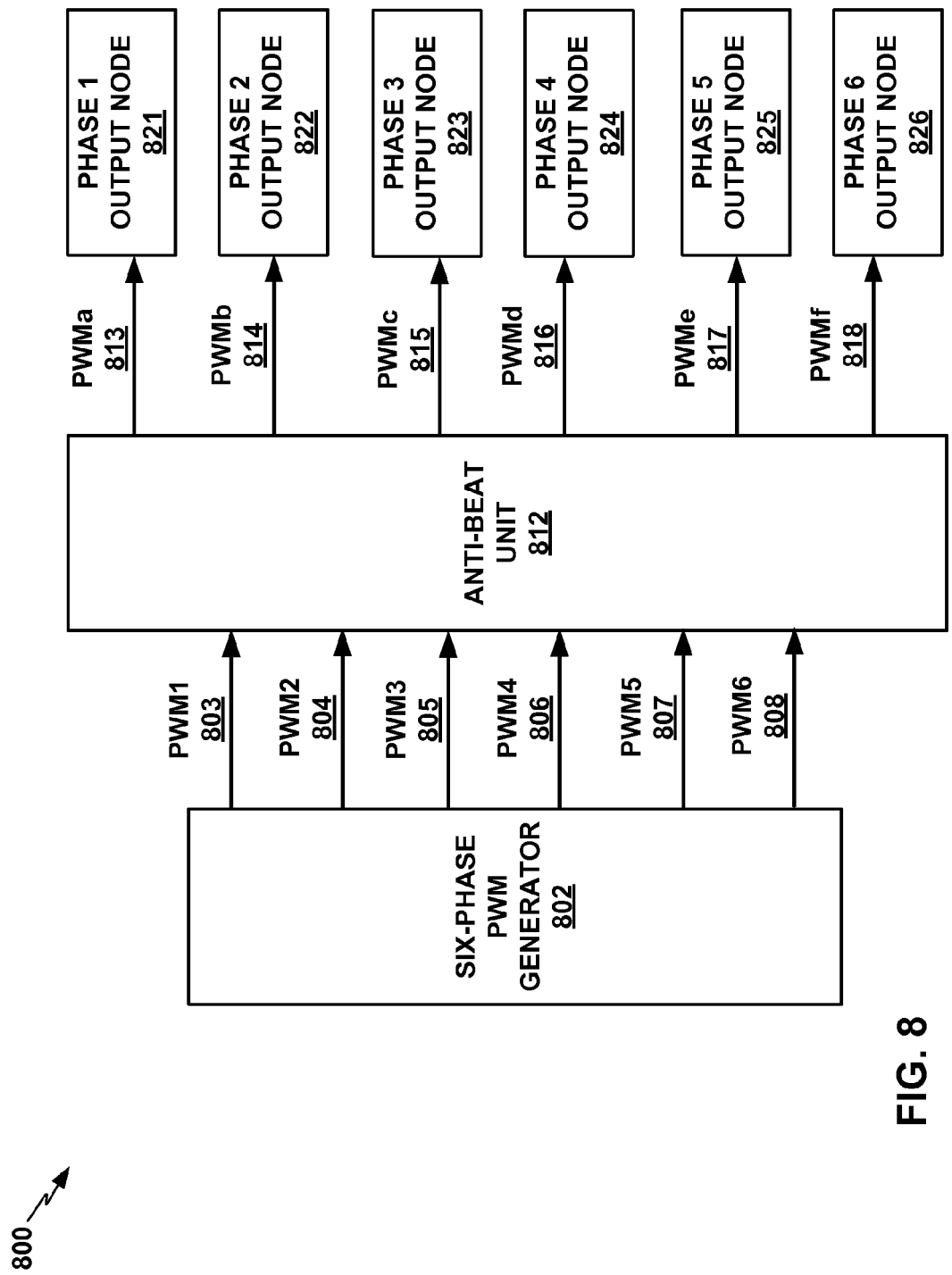
FIG. 8 depicts a block diagram illustrating a multiphase buck converter with six phase outputs, and with an anti-beat unit that enables dynamic phase firing in the multiphase buck converter, in accordance with an example of this disclosure.

FIG. 8 depicts a block diagram illustrating a multiphase buck converter 800 with six phase outputs, and with an anti-beat unit 812 that enables dynamic phase firing in multiphase buck converter 800, in accordance with an example of this disclosure. While the examples discussed above are directed to multiphase buck converters with two phase outputs, other examples of this disclosure may be directed to multiphase buck converters with three, four, five, six, or any number of phase outputs. In multiphase buck converter 800, six-phase PWM generator 802 applies six duty cycle signals 803, 804, 805, 806, 807, 808 to anti-beat unit 812. Anti-beat unit 812 receives the duty cycle signals, evaluates the current of some or all of the phase outputs, and in response, applies duty cycle signals 803, 804, 805, 806, 807, 808 to phase outputs 813, 814, 815, 816, 817, 818 in a way that potentially moderates the current of the phase outputs. Anti-beat unit 812 applies phase outputs 813, 814, 815, 816, 817, 818 to phase output nodes 821, 822, 823, 824, 825, 826. Anti-beat unit 812 may moderate the current of all of the phase outputs as applied to the phase output nodes.

For example, anti-beat unit 812 may admit passage of the duty cycle signals as the phase outputs in a regular, fixed phase firing order except if the current of any one phase output exceeds a threshold, and then rearrange the phase firing order to reduce or eliminate a number of pulses that otherwise would have been applied to the phase output with the extreme current. In another example, anti-beat unit 812 may continuously rearrange the phase firing order to always apply the next incoming duty cycle signal pulse to the phase output with the lowest current. Anti-beat unit 812 may also adjust or modify a trigger threshold or other evaluation criteria based on additional factors such as previous phase firing order state, a temperature of a downstream component, an accumulated charge on a downstream capacitor, or other factors, in various examples.

Figure 9:
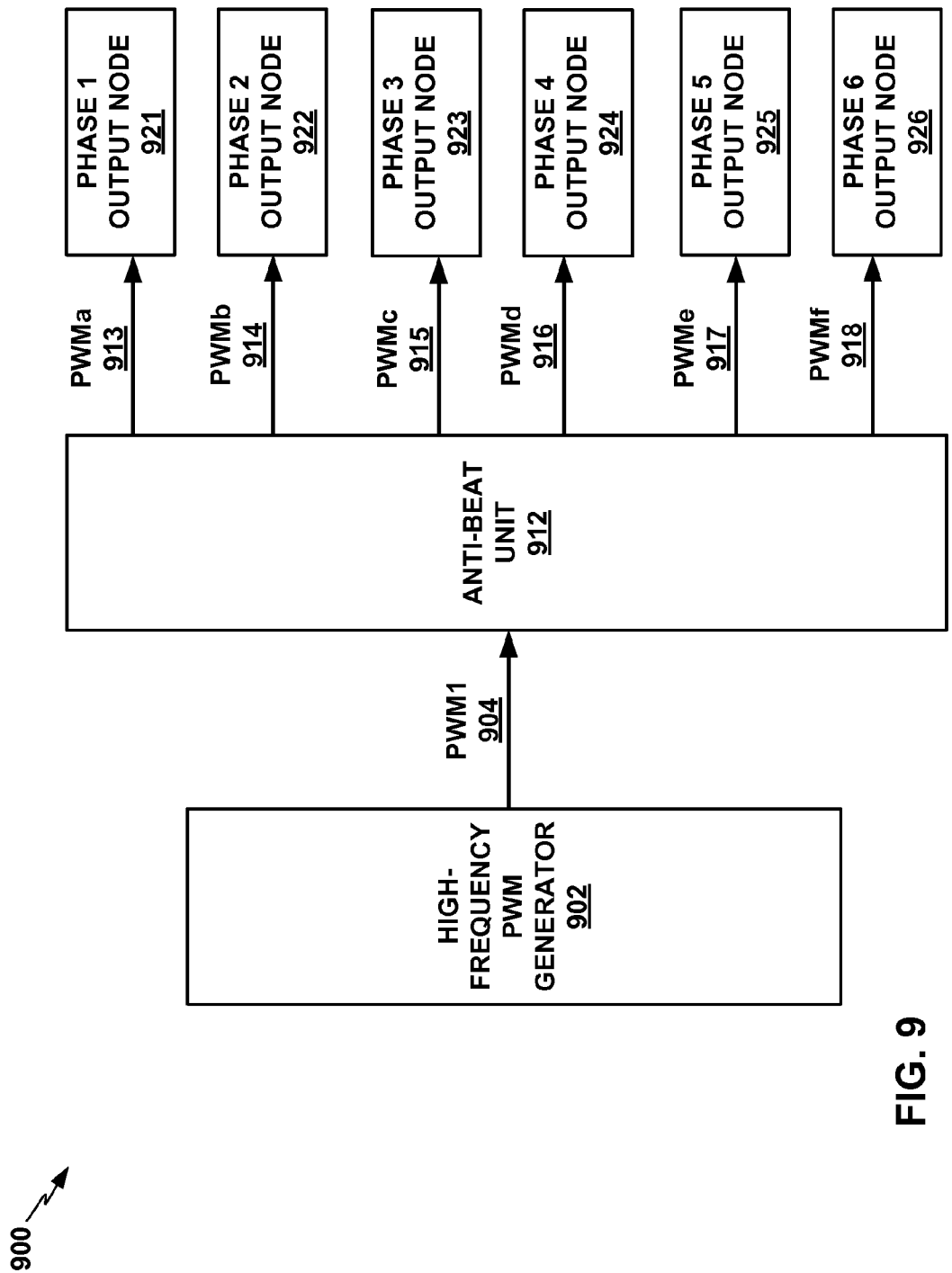
FIG. 9 depicts a block diagram illustrating a multiphase buck converter with a high-frequency PWM generator that applies a single, high-frequency duty cycle signal to an anti-beat unit that distributes the high-frequency duty cycle signal to six phase outputs with dynamic phase firing, in accordance with an example of this disclosure.

FIG. 9 depicts a block diagram illustrating a multiphase buck converter 900 with a high-frequency PWM generator 902 that applies a single, high-frequency duty cycle signal to an anti-beat unit 912 that distributes the high-frequency duty cycle signal to six phase outputs with dynamic phase firing, in accordance with an example of this disclosure. The example of FIG. 9 illustrates that an anti-beat unit of this disclosure may also operate without requiring multiple duty cycle signals from a PWM generator. Anti-beat unit 912 may simply distribute the pulses from high-frequency PWM generator 902 among any number of two or more (six in this example) phase outputs at a lower phase output frequency. Anti-beat unit 912 may meanwhile evaluate the current of one or more of the phase outputs and dynamically rearrange the phase output firing order to moderate their current.

Figure 10:
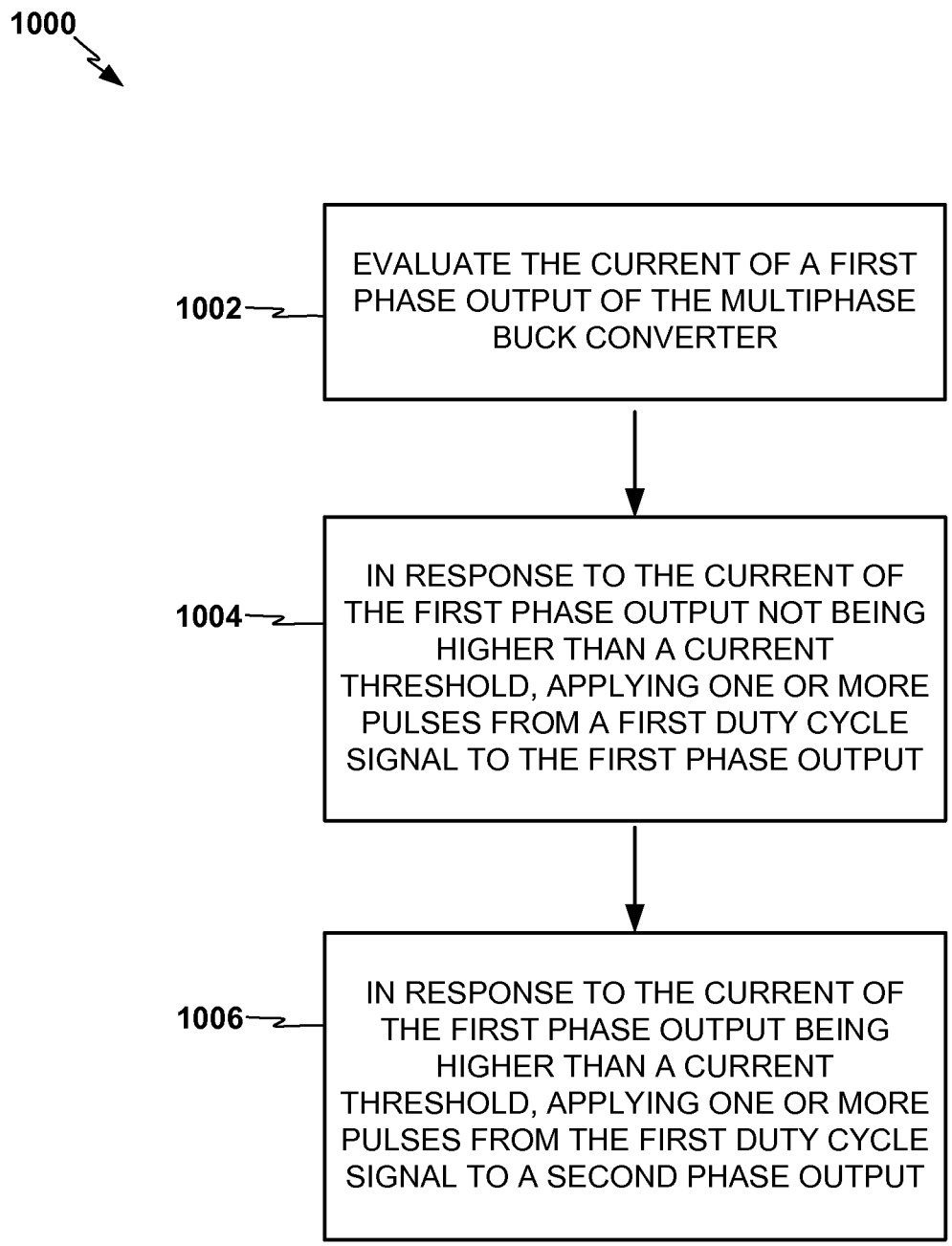
FIG. 10 is a flowchart illustrating a method of operating a multiphase buck converter with an anti-beat unit that enables dynamic phase firing, among other advantages, in accordance with an example of this disclosure.

FIG. 10 is a flowchart illustrating a method 1000 of operating a multiphase buck converter with an anti-beat unit that enables dynamic phase firing, among other advantages, in accordance with an example of this disclosure. Method 1000 may be a more generalized form of the operation of various anti-beat units and/or multiphase buck converters of this disclosure, including the examples described above with reference to FIGS. 1-9. In the example of FIG. 10, method 1000 includes evaluating a current of a first phase output of the multiphase buck converter (1002). In some examples, an anti-beat unit (e.g., any of anti-beat units 112, 312, 412, 512, 812, 912 as described above) or a component of an anti-beat unit (e.g., comparator 542 as described above) may evaluate the current of the first phase output (e.g., the current of either PWMa 114 or PWMb 116 as described with reference to FIGS. 1, 2, 4, and 5; or the current of either PWMa 314 or PWMb 316 as described with reference to FIG. 3; or either current signals I1 504 or I2 506 as described with reference to FIG. 5; or either the first phase current trailing average $I_{avg1}$ or the second phase current trailing average $I_{avg2}$ as described in reference to FIGS. 6 and 7; or the current of any of PWM outputs 813-818 or 913-918 of FIG. 8 or 9) of the multiphase buck converter.

Method 1000 further includes, in response to the current of the first phase output not being higher than a current threshold, applying (e.g., by any of anti-beat units 112, 312, 412, 512, 812, 912 as described above) one or more pulses from a first duty cycle signal (e.g., either PWM1 104 or PWM2 106 in FIGS. 1, 2, 4, and 5; either PWM1 304 or PWM2 306 of FIG. 3; either first phase current $I_{phase1}$ or second phase current $I_{phase2}$ of FIGS. 6 and 7; any of any of PWM outputs 803-808 or 903-908 of FIG. 8 or 9) to the first phase output (1004). Method 1000 further includes, in response to the current of the first phase output being higher than the current threshold, applying (e.g., by any of anti-beat units 112, 312, 412, 512, 812, 912 as described above) one or more pulses from the first duty cycle signal (e.g., either PWM1 104 or PWM2 106 in FIGS. 1, 2, 4, and 5; either PWM1 304 or PWM2 306 of FIG. 3; either first phase current $I_{phase1}$ or second phase current $I_{phase2}$ of FIGS. 6 and 7; any of any of PWM outputs 803-808 or 903-908 of FIG. 8 or 9) to a second phase output (1006).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, an anti-beat unit of this disclosure (e.g., anti-beat units 112, 312, 412, 512, 812, 912, or an anti-beat unit causing the dynamically rearranged phase output firing order of graph 700) may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein. The integrated circuit may be configured to apply an output to charge the inductor. The integrated circuit may be further configured to evaluate a comparison of an output voltage at the voltage output with a reference voltage. The integrated circuit may be further configured to evaluate a comparison of a current at the inductor with a threshold current. The integrated circuit may be further configured to, responsive to the output voltage at the voltage output being higher than the reference voltage, and the current at the inductor being higher than the threshold current, apply an output to couple the output capacitor to the voltage output through the inductor.

Various examples of the invention have been described. These and other examples are within the scope of the following claims.

What is claimed is:

1. A method of moderating phase output current of a multiphase buck converter, the method comprising:
    evaluating a current of a first phase output of the multiphase buck converter in comparison with a first current threshold;
    in response to the current of the first phase output not being higher than the first current threshold, applying one or more pulses from a first duty cycle signal to the first phase output;
    in response to the current of the first phase output being higher than the first current threshold, applying one or more pulses from the first duty cycle signal to a second phase output; and
    in response to the current of the first phase output being lower than a second current threshold subsequent to the applying of the one or more pulses from the first duty cycle signal to the second phase output, applying one or more subsequent pulses from the first duty cycle signal to the first phase output,
    wherein the first current threshold is set at least in part as the current of the second phase output plus a selected average current margin between the current of the first phase output and the current of the second phase output, and wherein the second current threshold is equal to the first current threshold minus a hysteresis margin that accounts for a hysteresis in responses of the second phase output to the applying of the one or more pulses from the first duty cycle signal to the second phase output, and
    wherein the average current margin between the current of the first phase output and the current of the second phase output is detected as an average over a sequence of at least two of the pulses.

2. The method of claim 1, further comprising:
    evaluating a current of the second phase output of the multiphase buck converter, wherein the first current threshold is based at least in part on the second phase output.

3. The method of claim 1, further comprising:
    evaluating a current of the second phase output of the multiphase buck converter;
    in response to the current of the second phase output not being lower than a low current threshold, applying one or more subsequent pulses from a second duty cycle signal to the second phase output; and
    in response to the current of the second phase output being lower than the low current threshold, applying one or more subsequent pulses from the second duty cycle signal to the first phase output.

4. The method of claim 1, wherein the first current threshold is set as a second duty cycle signal of the multiphase buck converter, and wherein evaluating the current of the first phase output comprises determining whether the first phase output is higher than the second phase output.

5. The method of claim 1, further comprising:
    receiving the first duty cycle signal and a second duty cycle signal from a pulse width modulation (PWM) generator, prior to the evaluating of the current of the first phase output;
    applying the first phase output to a first phase output node of the multiphase buck converter; and
    applying the second phase output to a second phase output node of the multiphase buck converter.

6. The method of claim 5, further comprising:
    receiving a first current signal indicating the current of the first phase output; and
    receiving a second current signal indicating the current of the second phase output,
    wherein evaluating the current of the first phase output of the multiphase buck converter comprises comparing the first current signal with the second current signal.

7. The method of claim 1, wherein the multiphase buck converter comprises more than two phase outputs, including a plurality of additional phase outputs besides the first phase output, and wherein applying the one or more pulses from the first duty cycle signal to the second phase output comprises selecting the second phase output from the plurality of additional phase outputs.

8. The method of claim 7, wherein the plurality of additional phase outputs comprises between two and five additional phase outputs.

9. The method of claim 7, wherein the multiphase buck converter further comprises more than two duty cycle signals, including a plurality of additional duty cycle signals besides the first duty cycle signal, and wherein evaluating the current of the first phase output comprises:
    comparing the current of each of the phase outputs; and
    selecting one of the phase outputs that has a highest current as the first phase output.

10. The method of claim 1, further comprising:
    evaluating one or more additional trigger conditions, in addition to evaluating the current of the first phase output of the multiphase buck converter; and prior to the evaluating of the current of the first phase output of the multiphase buck converter, adjusting the first current threshold based on the one or more additional trigger conditions.

11. The method of claim 10, wherein the one or more additional trigger conditions comprise a state of one or more previous phase firings of the multiphase buck converter.

12. The method of claim 10, wherein the one or more additional trigger conditions comprise a temperature proximate to an inductor downstream of the first phase output.

13. The method of claim 10, wherein the one or more additional trigger conditions comprise a charge accumulated by a capacitor downstream of the first phase output.

14. The method of claim 1, wherein the multiphase buck converter comprises a single duty cycle signal and a plurality of phase outputs, the single duty cycle signal is the first duty cycle signal, the single duty cycle signal is at a higher frequency than the phase outputs, and the plurality of phase outputs comprises the first phase output and the second phase output, the method further comprising the multiphase buck converter distributing the first duty cycle signal to the plurality of phase outputs, wherein the distributing of the first duty cycle signal to the plurality of phase outputs comprises the applying of the one or more pulses from the first duty cycle signal to the first phase output and the applying of the one or more pulses from the first duty cycle signal to the second phase output.

15. A circuit comprising:
a first input pin for receiving a first duty cycle signal of a pulse width modulator (PWM) generator of a multiphase buck converter;
a first output pin for coupling to a first phase output node of the multiphase buck converter;
a second output pin for coupling to a second phase output node of the multiphase buck converter; and
an anti-beat unit configured to:
evaluate a current of a first phase output of the multiphase buck converter in comparison with a first current threshold;
in response to the current of the first phase output not being higher than the first current threshold, apply one or more pulses from a first duty cycle signal to the first phase output node;
in response to the current of the first phase output being higher than the first current threshold, apply one or more pulses from the first duty cycle signal to the second phase output node; and
in response to the current of the first phase output being lower than a second current threshold subsequent to the applying of the one or more pulses from the first duty cycle signal to the second phase output, applying one or more subsequent pulses from the first duty cycle signal to the first phase output,
wherein the first current threshold is set at least in part as the current of the second phase output plus a selected average current margin between the current of the first phase output and the current of the second phase output, and wherein the second current threshold is equal to the first current threshold minus a hysteresis margin that accounts for a hysteresis in responses of the second phase output to the applying of the one or more pulses from the first duty cycle signal to the second phase output, and
wherein the average current margin between the current of the first phase output and the current of the second phase output is detected as an average over a sequence of at least two of the pulses.

16. The circuit of claim 15, wherein the anti-beat unit is further configured to:
evaluate one or more additional trigger conditions, in addition to evaluating the current of the first phase output of the multiphase buck converter;
prior to the evaluating of the current of the first phase output of the multiphase buck converter, adjust the first current threshold based on the one or more additional trigger conditions; and
in response to the current of the first phase output being lower than a second current threshold subsequent to the applying of the one or more pulses from the first duty cycle signal to the second phase output, apply one or more subsequent pulses from the first duty cycle signal to the first phase output node.

17. A device for moderating phase output current of a multiphase buck converter, the de vice comprising:
means for evaluating a current of a first phase output of the multiphase buck converter in comparison with a first current threshold;
means for applying, in response to the current of the first phase output not being higher than the first current threshold, one or more pulses from a first duty cycle signal to the first phase output node; and
means for applying, in response to the current of the first phase output being higher than the current threshold, one or more pulses from the first duty cycle signal to the second phase output node; and
means for applying, in response to the current of the first phase output being lower than a second current threshold subsequent to the applying of the one or more pulses from the first duty cycle signal to the second phase output, one or more subsequent pulses from the first duty cycle signal to the first phase output,
wherein the first current threshold is set at least in part as the current of the second phase output plus a selected average current margin between the current of the first phase output and the current of the second phase output, and wherein the second current threshold is equal to the first current threshold minus a hysteresis margin that accounts for a hysteresis in responses of the second phase output to the applying of the one or more pulses from the first duty cycle signal to the second phase output, and
wherein the average current margin between the current of the first phase output and the current of the second phase output is detected as an average over a sequence of at least two of the pulses.

18. A method of moderating phase output current of a multiphase buck converter, the method comprising:
evaluating a current of a first phase output of the multiphase buck converter in comparison with a first current threshold;
in response to the current of the first phase output not being higher than the first current threshold, applying one or more pulses from a first duty cycle signal to the first phase output;
in response to the current of the first phase output being higher than the first current threshold, applying one or more pulses from the first duty cycle signal to a second phase output; and
in response to the current of the first phase output being lower than a second current threshold subsequent to the applying of the one or more pulses from the first duty cycle signal to the second phase output, applying one or more subsequent pulses from the first duty cycle signal to the first phase output, wherein the first current threshold is set at least in part as the current of the second phase output plus a selected average current margin between the current of the first phase output and the current of the second phase output, and wherein the second current threshold is equal to the first current threshold minus a hysteresis margin that accounts for a hysteresis in responses of the second phase output to the applying of the one or more pulses from the first duty cycle signal to the second phase output, and wherein the average current margin between the current of the first phase output and the current of the second phase output is detected as an average between a trailing average of the current of the first phase output and a trailing average of the current of the second phase output.

* * * * *